US011858342B2

(12) United States Patent
Auer et al.

(10) Patent No.: US 11,858,342 B2
(45) Date of Patent: Jan. 2, 2024

(54) ELECTRIC-MOTOR-DRIVEN RIGID AXLE FOR VEHICLES, IN PARTICULAR UTILITY VEHICLES, WITH ELECTRIC MOTORS NEAR TO THE WHEELS AND WITH OFFSET TRANSMISSIONS

(71) Applicant: ZF Friedrichshafen AG, Friedrichshafen (DE)

(72) Inventors: Thomas Auer, Passau (DE); Sebastian Paulik, Tiefenbach (DE); Johannes Schweizer, Angermünde (DE); Harald Wendl, Vilshofen (DE); Gerhard Obermaier, Tiefenbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 163 days.

(21) Appl. No.: 17/312,990

(22) PCT Filed: Dec. 13, 2019

(86) PCT No.: PCT/EP2019/085008
§ 371 (c)(1),
(2) Date: Jun. 11, 2021

(87) PCT Pub. No.: WO2020/120722
PCT Pub. Date: Jun. 18, 2020

(65) Prior Publication Data
US 2022/0072951 A1 Mar. 10, 2022

(30) Foreign Application Priority Data
Dec. 13, 2018 (DE) ..................... 10 2018 221 612.6

(51) Int. Cl.
*B60K 17/04* (2006.01)
*B60K 7/00* (2006.01)

(52) U.S. Cl.
CPC .......... *B60K 17/046* (2013.01); *B60K 7/0007* (2013.01); *B60K 2007/0038* (2013.01);
(Continued)

(58) Field of Classification Search
CPC ................ B60K 17/046; B60K 7/0007; B60K 2007/0038; B60K 2007/0046; B60K 2007/0061
See application file for complete search history.

(56) References Cited

U.S. PATENT DOCUMENTS 5,419,406 A * 5/1995 Kawamoto .............. B60K 1/02
475/5
7,169,077 B2 1/2007 Laurent et al.
(Continued)

FOREIGN PATENT DOCUMENTS

DE 41 12 624 C1 10/1992
DE 295 18 401 U1 4/1997
(Continued)

OTHER PUBLICATIONS

German Search Report Corresponding to 10 2018 221 612.6 dated Oct. 2, 2020.
(Continued)

*Primary Examiner* — Erez Gurari
(74) *Attorney, Agent, or Firm* — Finch & Maloney PLLC

(57) ABSTRACT

An electric-motor-driven rigid axle for vehicles. The axle has a body with wheel carriers and points for attachment to a vehicle frame such that, in a cross-section, an upper end of the body faces the frame and a body axis forms a vertical axis extending toward the upper end and intersecting the wheel axis. The axle has electric motors and offset transmissions. The motors drive respective carriers. The transmissions are respectively interposed between the associated motor and carrier. The transmissions enable the shafts of the
(Continued)

respective motors to be offset from the wheel axis. The transmissions are arranged such that, in the cross-sectional view, the motor shafts and the wheel axis form intersection points on an offset line which is at an angle of between 1 and 90 degrees to the vertical axis and the vertex is at an intersection point between the wheel axis and the offset line.

16 Claims, 5 Drawing Sheets

(52) U.S. Cl.
CPC ............... *B60K 2007/0046* (2013.01); *B60K 2007/0061* (2013.01); *B60Y 2200/14* (2013.01)

(56) References Cited

U.S. PATENT DOCUMENTS

| | | | | |
|---|---|---|---|---|
| 7,703,565 | B2* | 4/2010 | Ikenoya | B60K 17/356 180/65.6 |
| 8,037,957 | B2* | 10/2011 | Laurent | B60K 7/0007 180/65.6 |
| 9,862,289 | B1* | 1/2018 | Crecelius | B60L 3/106 |
| 10,486,512 | B2* | 11/2019 | Bassis | B60K 17/354 |
| 2013/0109525 | A1 | 5/2013 | Van Druten et al. | |
| 2014/0349801 | A1 | 11/2014 | Brenner | |
| 2017/0063202 | A1* | 3/2017 | Caron | H02K 7/102 |
| 2017/0282928 | A1* | 10/2017 | Sakaguchi | B60W 10/08 |
| 2018/0056774 | A1* | 3/2018 | Chan | B60K 17/145 |
| 2018/0297469 | A1* | 10/2018 | Liu | B60K 17/36 |
| 2019/0118650 | A1* | 4/2019 | Han | B60K 17/35 |
| 2019/0176618 | A1* | 6/2019 | Bassis | B60K 1/02 |
| 2019/0283518 | A1* | 9/2019 | Battaglia | B60G 11/08 |
| 2019/0293158 | A1* | 9/2019 | Brown | B60K 1/00 |
| 2019/0375305 | A1* | 12/2019 | Matt | H02K 11/0094 |
| 2020/0009959 | A1* | 1/2020 | Fukasawa | B60G 9/00 |
| 2020/0023734 | A1* | 1/2020 | Crotti | B60K 5/00 |
| 2020/0180426 | A1* | 6/2020 | Chopra | B60K 17/04 |
| 2020/0262293 | A1* | 8/2020 | Glückler | B60K 17/06 |
| 2020/0384806 | A1* | 12/2020 | Falls | B60K 17/046 |
| 2021/0061093 | A1* | 3/2021 | Li | B60B 35/002 |
| 2021/0179170 | A1* | 6/2021 | Cowper | E02F 3/7609 |
| 2022/0072951 | A1* | 3/2022 | Auer | B60K 17/046 |
| 2022/0134855 | A1* | 5/2022 | Zhang | B60K 17/16 180/65.1 |
| 2022/0320946 | A1* | 10/2022 | Varela | H02K 9/19 |
| 2023/0001777 | A1* | 1/2023 | Wang | B60K 1/02 |

FOREIGN PATENT DOCUMENTS

| | | |
|---|---|---|
| DE | 295 18 402 U1 | 4/1997 |
| DE | 10 2004 016 348 U1 | 1/2005 |
| DE | 10 2011 089 021 A1 | 6/2013 |
| EP | 1 690 725 A2 | 8/2006 |

OTHER PUBLICATIONS

International Search Report Corresponding to PCT/EP2019/085008 dated Mar. 16, 2020.
Written Opinion Corresponding to PCT/EP2019/085008 dated Mar. 16, 2020.

* cited by examiner

ELECTRIC-MOTOR-DRIVEN RIGID AXLE FOR VEHICLES, IN PARTICULAR UTILITY VEHICLES, WITH ELECTRIC MOTORS NEAR TO THE WHEELS AND WITH OFFSET TRANSMISSIONS

This application is a National Stage completion of PCT/EP2019/085008 filed Dec. 13, 2019, which claims priority from German patent application serial no. 10 2018 221 612.6 filed Dec. 13, 2018.

FIELD OF THE INVENTION

The invention relates to an electric-motor-driven rigid axle for vehicles, for example utility vehicles. The invention also relates to a structural unit with a rigid axle of this type and two wheel brakes. Furthermore the invention relates to a motor vehicle, such as a utility vehicle.

BACKGROUND OF THE INVENTION

An electric-motor-driven rigid axle is known from DE 295 18 401 U1. In the area of its two longitudinal ends the rigid axle has in each case a wheel mounted to rotate about a wheel axis, and has two electric motors close to the wheels, in each case with an electric motor associated with a respective wheel, which motor serves to drive the wheel. Driving takes place by way of a respective step-down transmission interconnected between the wheel concerned and the associated electric motor, the transmission serving to change down the rotational speed of the electric motor in order to obtain a higher torque. The respective step-down transmissions are in the form of offset transmissions, such that the wheel axis of the wheel concerned and the driveshaft of the associated electric motor are parallel but offset relative to one another. This offset is used, when the rigid axle is fitted in a motor vehicle, to arrange the respective electric motor lower down than would be possible with a coaxial arrangement of the driveshaft of the electric motor and the wheel axis.

SUMMARY OF THE INVENTION

A purpose of the present invention is to optimize an electric-motor-driven rigid axle of the type mentioned to begin with, in relation to the space it occupies. In particular, the rigid axle should be able to use a given fitting space in a motor vehicle, especially a utility vehicle, which space for example was originally designed for the fitting of a conventional rigid axle, i.e. a rigid axle without electric motors. In particular, in addition the rigid axle should be able to be used in a given fitting space of a motor vehicle, particularly a utility vehicle, without having to make structural adaptations of the motor vehicle, or at least, so as to minimize any such structural adaptations in the motor vehicle.

This objective is achieved by an electric-motor-driven rigid axle having the features specified in the independent claim(s). Further, the objective is achieved with a structural unit having the features specified in the independent claim(s). Moreover, to achieve the objective a motor vehicle with the characteristics of the independent claim(s) is proposed. Advantageous embodiments and/or design features and/or aspects of the invention emerge from the subordinate claims, the description given below, and the figures.

A basic electric-motor-driven rigid axle for vehicles, particularly utility vehicles, comprises an axle body, two wheel carriers and at least one and preferably more attachment points for fixing the axle body to a vehicle frame. The axle body is of elongated shape and at opposite longitudinal ends has in each case one of the wheel carriers, these being able to rotate relative to the axle body about a respective wheel axis. The wheel carriers serve in each case for the fixing of at least one vehicle wheel. In particular the wheel carriers are arranged opposite one another with the axle body between them. For example, the wheel carriers are mounted rotatably on the axle body. In particular the wheel carriers are arranged coaxially with one another. In particular the wheel axes lie on a common axis.

The attachment points are designed to fix the axle body onto the vehicle frame in such manner that as viewed in a cross-section of the rigid axle, at an upper end the axle body faces toward the vehicle frame and an axis of the axle body forms a vertical axis extending in the direction toward the upper end, which axis intersects with the wheel axis. The term "vertical axis" is in particular understood to mean an axis which is perpendicular to a reference plane. The reference plane can be a road section on which the vehicle equipped with the rigid axis is standing. In addition or alternatively, the reference plane used can be the undersurface of the vehicle and/or the vehicle frame. If the reference plane is horizontal, the vertical axis is an axis that extends vertically.

The rigid axle also comprises two electric motors arranged close to the wheels, each having a motor shaft and two offset transmissions. In particular, the electric motors and/or the motor shafts are arranged coaxially with one another. Each of the electric motors serves to drive one of the wheel carriers and in each case one of the offset transmissions is interposed between one of the electric motors and the wheel carrier in drive connection therewith. In particular the offset transmissions are in each case designed as step-down transmissions and/or have at least one step-down stage. By virtue of the offset transmissions the motor shaft of the electric motor concerned and the wheel axis of the associated wheel carrier are arranged parallel to and offset from one another, and viewed in a cross-section of the rigid axle, the motor shaft of the respective electric motor and the wheel axis of the associated wheel carrier offset from it form an intersection point on an offset line.

In this description the term "electric motor" is understood to mean any type of machine that converts electrical power into mechanical power. Accordingly, in this description the term "electric motor" is understood to be a synonym for an electric machine. The term "motor shaft" in this description is understood to mean a driveshaft or drive output shaft of the electric motor. The expression "close to a wheel" in this description means in particular that the electric motors are arranged close to the wheel carriers with which they are respectively in driving association, i.e. preferably in the area of the rigid axle at a certain distance from the associated wheel carrier, and in particular not directly on or in the associated wheel carrier.

In an embodiment the offset transmissions are orientated in such manner that as viewed in a cross-section of the rigid axle, the offset line and the vertical axis are inclined at an angle relative to one another, the vertex of the angle being at the intersection of the wheel axle with the offset line, the size of the angle having a value between 1 degree and 90 degrees. In particular, it is provided that the size of the angle has a value between 2 and 85 degrees, particularly between 4 and 80 degrees, in particular between 6 and 75 degrees, particularly between 8 and 70 degrees, in particular between 10 and 65 degrees, particularly between 12 and 60 degrees, in particular between 15 and 55 degrees, particularly between 20 and 50 degrees, especially between 25 and 45 degrees, in particular between 30 and 40 degrees, the value being for example approximately 31, 32, 33, 34, 35, 36, 37, 38 or 39 degrees. For example, the size of the angle has a value between 5 and 90 degrees. Basically, the angle can have a positive value or a negative value.

This favors a structural form of the rigid axle which can use a given fitting space for example in a motor vehicle, without having to carry out structural modifications to the motor vehicle for this, or at least being able to minimize any structural changes required. By virtue of the angled position of the offset line relative to the vertical axis, the respective electric motor can be positioned in such manner that the installation of the rigid axle in a fitting space of a vehicle dimensioned for fitting a conventional rigid axle, i.e. a rigid axle without electric motors, is facilitated. Furthermore it is also easier to position the respective electric motor so that sufficient ground clearance between the rigid axle and the road and/or a sufficient compression travel of the rigid axle is maintained. Moreover, the angled position of the offset line makes it possible to have recourse to standard components for the rigid axle so far as a wheel brake and/or a suspension and/or a control arm and/or the set of tires provided are concerned, which components are for example those already in use with the conventional rigid axle.

The proposed rigid axle provides the possibility of fitting a vehicle which has a conventional combustion-engine drive unit, additionally or alternatively with an electric motor drive system without having to carry out structural modifications or adaptations of the vehicle for that, or at least only slight structural modifications or adaptations. The fitting space provided for the original rigid axle not driven by electric motors can be used. In that way components originally provided, such as a combustion engine and/or a transmission and/or a cardan shaft and/or a differential, can be saved and the space they occupied can be used as additional space, for example to accommodate an electrical storage device, in particular an accumulator unit, for the electric motors of the rigid axle.

According to a possible embodiment, the offset transmissions are orientated in such manner that as viewed in a cross-section of the rigid axle, relative to the associated motor shaft the respective wheel axis is offset in the direction toward the upper end of the axle body, and relative to the wheel axis the associated motor shaft is offset laterally in a direction away from the vertical axis. Thus, relative to the wheel axis the motor shaft and hence the electric motor is offset obliquely downward. This diagonal offset or diagonal misalignment makes it possible, for example in contrast to a vertical offset in which the offset line coincides with the vertical axis, to have a larger downward clearance between the rigid axle and the road, and due to the lateral displacement in the case of the diagonal offset, creates a larger free space in order, for example, to accommodate an actuator device for a wheel brake and/or a brake cylinder.

For example, the offset transmissions are orientated such that as viewed in a cross-section of the rigid axle, relative to the wheel axis of the associated wheel carrier, the motor shaft of the respective electric motor is offset in a direction away and to the left of the vertical axis. Alternatively, the offset transmissions can also be orientated in such manner that as viewed in a cross-section of the rigid axle, relative to the wheel axis of the associated wheel carrier motor shaft of the respective electric motor is offset in a direction away and to the right of the vertical axis.

In one embodiment, the offset of the wheel axis of the respective wheel carrier and the motor shaft of the associated electric motor can be produced if the offset transmissions each have a drive input shaft and a drive output shaft parallel to and offset therefrom. In particular the respective drive input shaft is or can be drive-connected to the motor shaft of the associated electric motor, and in particular the respective drive output shaft is or can be functionally connected to the associated wheel carrier in each case. For example, the drive input shafts are arranged coaxially with the motor shafts and/or the drive output shafts coaxially with the wheel axes. In particular, the offset transmissions also each comprise at least one gearset, for example a single gearset. For example, the at least one gearset comprises at least one spur gear pair.

A possible design of the respective offset transmission consists in that the at least one gearset comprises a main gearwheel, at least one intermediate gearwheel and a ring gear. In particular it is provided that the main gear and the at least one intermediate gear mesh with one another and with the inner teeth of the ring gear. In particular it is provided that the main gear is associated with the drive input shaft and the ring gear with the drive output shaft, or conversely, the main gear is associated with the drive output shaft and the ring gear with the drive input shaft. For example, the main gear and the drive input shaft are connected rotationally fixed to one another, in particular formed on one another. For example, the at least one intermediate gear is mounted rotatably on a rotation axis fixed on the housing, especially with an intermediate bearing. The bearing can be a roller bearing, in particular a cylindrical roller bearing, or a slide bearing.

A possible further design consists in that the ring gear forms a sidewall of a pot-shaped transmission element which has at one axial end a bottom, i.e. being closed or largely closed there, while at the other axial end it is open. For example the transmission element, in particular the bottom, is connected rotationally fixed to the drive output shaft or the drive input shaft, or is formed on it, while the open axial end faces toward a housing component. The housing component can be one which accommodates the associated electric motor. For example, the housing component is fixed onto the axle body or formed on the axle body, or it forms an integral part of the axle body.

Thanks to the at least one gearset provided, it is in particular possible for the offset transmission concerned to have a fixed step-down ratio. Alternatively, it can also be provided that the offset transmissions are in each case designed to be shifted between at least two gear steps. A possible embodiment then consists in that the offset transmissions each comprise a drive input shaft and a drive output shaft parallel to and offset from it, wherein the respective drive input shaft is or can in each case be in driving connection with the associated electric motor and the respective drive output shaft is or can be in diving connection with the associated wheel carrier. In particular it is also provided that in each case the offset transmissions comprise at least two gearsets, in particular exclusively two gearsets, and in each case at least one shifting element, in particular a single shifting element. For example, it is provided that the at least two gearsets each comprise at least one spur gear pair.

Preferably, each of the at least two gearsets forms one of the at least two gear steps. Preferably, the at least one shifting element is designed to be brought to at least two shifting positions, in which the drive input shaft and the drive output shaft are drivingly coupled to one another in each case by one of the at least two gearsets. Thus, the at least one shifting element can be designed to couple the drive input shaft and the drive output shaft in driving connection with one another by way of one of the at least two gearsets in one of the at least two shifting positions, and in another of the at least two shifting positions to couple the drive input shaft and the drive output shaft in driving connection with one another by way of another of the at least two gearsets. In addition, it can be provided that the at least one shifting element is further designed to be brought to a neutral position and/or to a further shifting position in which the drive input shaft and the drive output shaft are not in driving connection with one another.

A possible embodiment of an electric-motor-driven rigid axle in which the two electric motors can each be shifted in each case to at least two gear steps, in particular of the above-described rigid axle, is described in a patent application filed at the German Patent and Trademark Office on the same day as the present application, under the title "Electric-motor-driven rigid axle for vehicles, in particular utility vehicles, and method for its operation, computer program product, control and/or regulating device and motor vehicle". The content of that patent application is herewith incorporated in its entirety in the present description.

It can be provided that the rigid axle has a center which, relative to the distance between the wheel carriers, is half that distance away from each wheel carrier. For example, the rigid axle is configured symmetrically relative to a central axis or transverse axis which is perpendicular to the longitudinal axis of the rigid axle, and comprises at least two structural units preferably identical to one another which are joined at or in the area of the central axis. In one design the electric motors are positioned in the area of the central or transverse axis. For example, it is provided that the electric motors are each accommodated in the axle body or at least partially held therein, and for example, are arranged one behind the other as viewed in the longitudinal direction of the rigid axle.

A further embodiment consists in that in the area of the wheel carrier, in particular inside the wheel carrier, the rigid axle comprises in each case a countershaft transmission and the offset transmissions are arranged on the respectively associated countershaft transmissions and the respectively associated electric motor. In particular it is provided that the countershaft transmissions are in each case in the form of step-down transmissions or comprise such a transmission. For example, the countershaft transmissions each comprise a planetary gearset or are formed by a planetary gearset. It can be provided that the distance between the respective offset transmission and the associated wheel carrier, particularly the countershaft transmission provided, is larger than the distance between the respective offset transmission and the associated electric motor. For example, the offset transmissions are in each case arranged close to the associated electric motors.

Furthermore, an aspect of the invention relates to a structural unit with the above-described rigid axle and two wheel brakes, of which in each case one wheel brake is associated with one of the wheel carriers of the rigid axle. The wheel brakes can be disk brakes. In particular it is provided that the electric motors of the rigid axle are each associated with and accommodated in a housing component of the axle body of the rigid axle, in particular the housing component described earlier. For example, the respective housing component is arranged coaxially with the motor shaft of the associated electric motor. Further, it is in particular provided that in each case adjacent, and in particular directly and/or immediately adjacent to the housing component, an actuator housing of an actuator device of the wheel brake is arranged. The actuator device serves to actuate the wheel brake. For example, by means of the actuator device at least one brake shoe of the wheel brake can be actuated in order to exert a braking force. The wheel brake can be a service brake and/or a parking or holding brake, and can exercise a service brake function or a parking or holding brake function.

In one embodiment, it is provided that the outer circumference of the actuator housing is arranged under a tangent of the housing component, wherein the tangent extends or is arranged perpendicularly to the vertical axis described earlier in connection with the rigid axle. For example, it is provided that the outer circumference of the actuator housing is arranged under a horizontal line that extends perpendicularly to the vertical axis, which line intersects with the wheel axis. The wheel brake, in particular the actuator device or the actuator housing, can be such components or assemblies which are already used in connection with a conventional rigid axle of the type described earlier. Thanks to the design of the proposed rigid axle there is sufficient room in a given structural space, for example in a vehicle, for such components to be able to be used.

According to a further aspect of the invention a motor vehicle, in particular a utility vehicle is provided. The vehicle or utility vehicle comprises the rigid axle described above and/or the assembly described above.

BRIEF DESCRIPTION OF THE DRAWINGS

Further details and features of the invention emerge from the following description of an example embodiment, with reference to the drawing which shows.

DETAILED DESCRIPTION OF THE PREFERRED EMBODIMENTS

Figure 1:
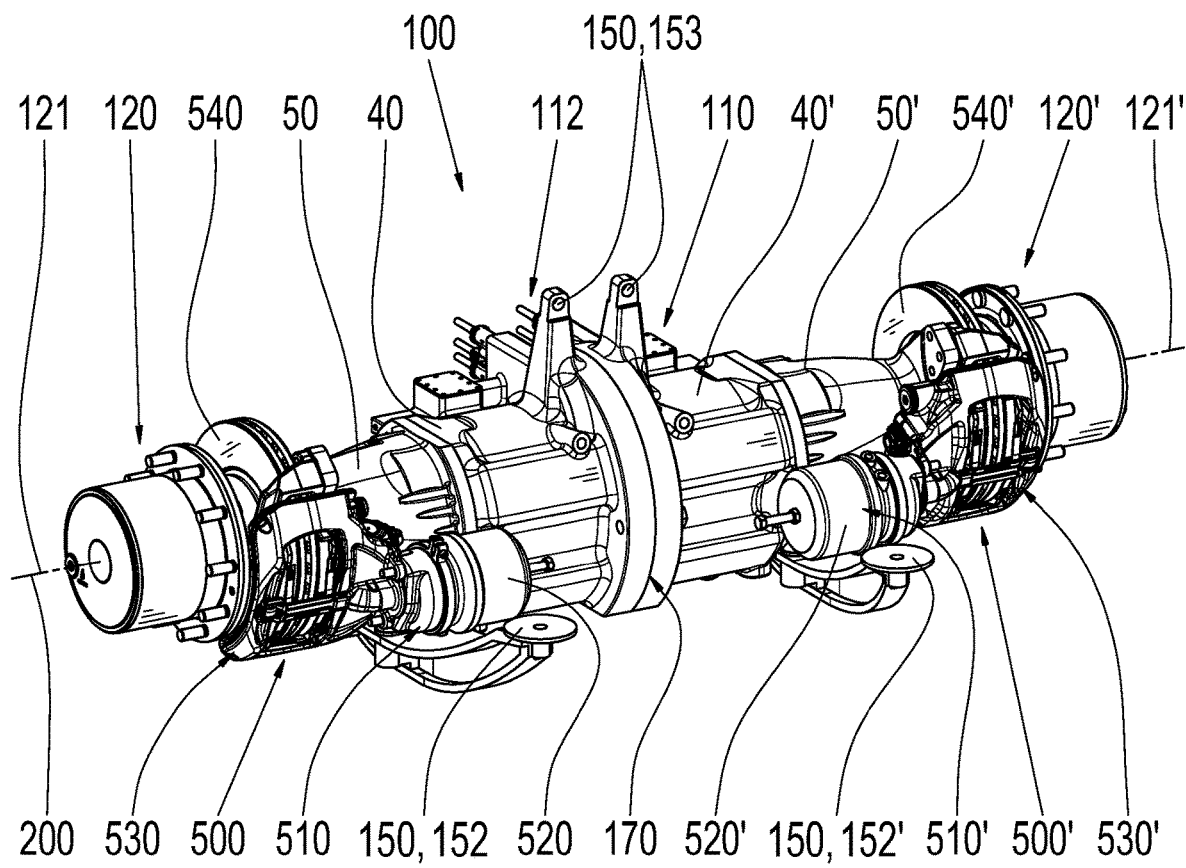
FIG. 1: A possible embodiment of an electric-motor-driven rigid axle, viewed in perspective.
Figure 2:
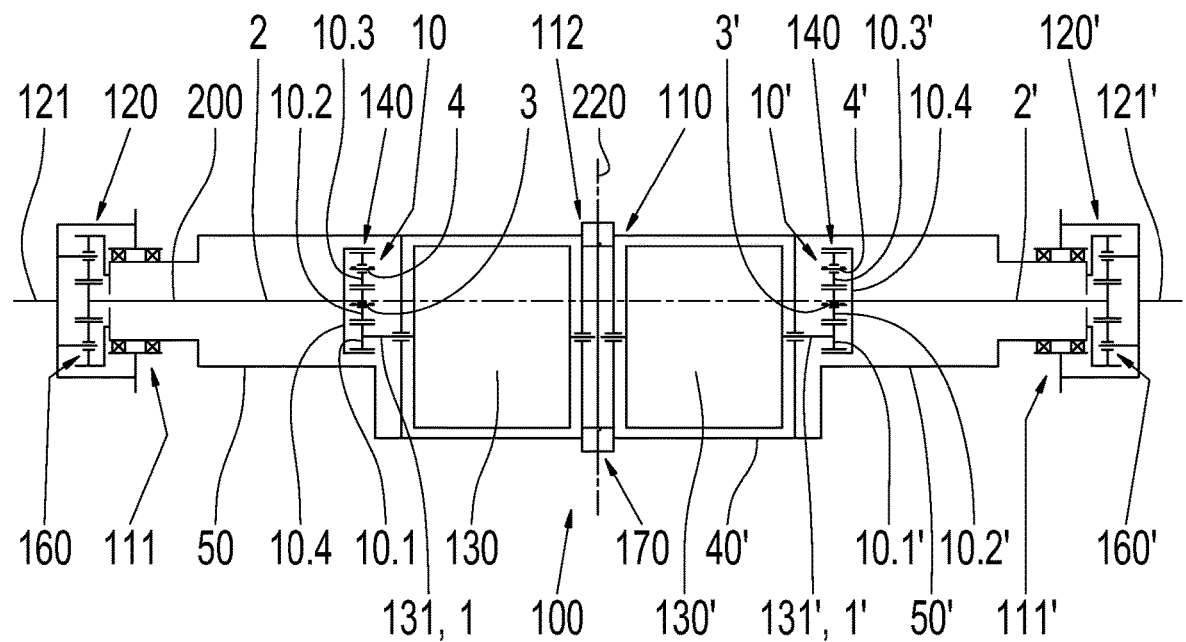
FIG. 2: A schematic representation of the rigid axle of FIG. 1, FIG. 3: The rigid axle of FIG. 1 in a fitted arrangement, fitted on a vehicle frame and with a double-tire at one longitudinal end, viewed from above.

FIG. 1 shows a possible embodiment of an electric-motor-driven rigid axle 100, which is suitable for use in motor vehicles, for example utility vehicles. FIG. 2 shows the structure of the rigid axle 100, illustrated schematically. The rigid axle 100 comprises an axle body 110, which is preferably of elongated form and extends along a longitudinal axis 200. The rigid axle 100 further comprises two wheel carriers 120, 120', each of which serves for the fitting of at least one vehicle wheel (not shown in FIGS. 1 and 2). The wheel carriers 120, 120' are located at opposite longitudinal ends 111, 111' of the axle body 110 and can in each case be rotated relative to the axle body 110 about a wheel axis 121, 121'. Preferably, the wheel carriers 120, 120' are mounted rotatably on the axle body 110. Preferably, the wheel axes 121, 121' are coaxial with one another. Preferably, the wheel axes 121, 121' are coaxial with the longitudinal axis 200.

The rigid axle 100 further comprises two electric motors 130, 130', each of which serves to drive one of the wheel carriers 120, 120'. Preferably, the electric motors 130, 130' are arranged close to the wheels. For example, the electric motors 130, 130' are respectively arranged in the area of a center 170. For example, the center 170 is located between the wheel carriers 120, 120' half-way between the respective wheel carriers 120 and 120', and lies on a transverse axis 220 which, for example, corresponds to a longitudinal axis of the vehicle (not shown in FIGS. 1 and 2). For example, the electric motors 130, 130' are each accommodated in a housing 40, 40'. Preferably, the housing components 40, 40' are each parts of an assembly of the axle body 110.

Preferably, the assemblies are joined together in the area of the transverse axis 220 or at the transverse axis 220. Preferably, the rigid axle 100 as a whole is symmetrical relative to the transverse axis 220 and the center 170. The electric motors 130, 130' each have a motor shaft 131, 131' by which the wheel carrier 120 or 120' associated with the respective electric motor 130 or 130' is driven. Preferably, the motor shaft 131 or 131' forms an axis of the respective electric motor 130, 130'. Preferably, the respectively associated housing component 40 or 40' is arranged coaxially relative to the motor shaft 131, 131' or motor axis.

In the rigid axle 100, between the respective motor shaft 131, 131' and the wheel axis 121, 121' of the associated wheel carrier 120 or 120' an offset is provided. This offset is produced by a respective offset transmission 140, 140' which is connected respectively between the electric motor 130, 130' and the associated wheel carrier 120, 120'. Preferably, the offset transmissions 140, 140' are in the form of step-down transmissions and, for example, each comprises at least one spur gear pair. Preferably, the offset transmissions 140, 140' each have a drive input shaft 1, 1' and a drive output shaft 2, 2', which are arranged offset relative to one another and thus produce the parallel offset between the motor shafts 130, 130' and the associated wheel axis 121, 121'. For this, for example, the respective drive input shafts 1 or 1' are connected to the associated electric motors 130, 130' and the respective drive output shafts 2 or 2' are connected to the associated wheel carriers 120, 120'.

Preferably, the drive input shaft 1 or 1' concerned is arranged coaxially with the motor shaft 131, 131' of the respectively associated electric motor 130 or 130'. Preferably, the drive input shaft 1 or 1' is coupled rotationally fixed to the motor shaft 131 or 131' of the electric motor 130 or 130' concerned. Preferably, the drive output shaft 2 or 2' concerned is coaxial with the wheel axis 121, 121' of the wheel carrier 120 or 120' concerned. Preferably, the drive output shaft 2 or 2' is functionally connected to the associated wheel carrier 120 or 120'. Preferably, the offset transmissions 140, 140' are associated with or accommodated in a further housing component 50, 50'. For example, the housing component 50, 50' is a hub carrier on which, for example, the respectively associated wheel carrier 120 or 120' is supported and/or rotationally mounted. Preferably, the further housing component 50 or 50' forms part of an assembly of the axle body 110. Preferably, the housing 50 or 50' is arranged coaxially with the wheel axis 121 or 121' of the respectively associated wheel carrier 120 or 120'. The respective offset transmission 140, 140' is accommodated therein.

The rigid axle 100 can comprise two countershaft transmissions 160 and 160'. For example, the countershaft transmissions 160, 160' are arranged each in the area of one of the wheel carriers 120, 120'. For example, each of the countershaft transmissions 160 or 160' is arranged inside the associated wheel carrier 120, 120'. Preferably, the offset transmissions 140, 140' are arranged in each case between the countershaft transmissions 160 or 160' and the associated electric motor 130 or 130'. For example, the distance between the respective offset transmission 140 or 140' and its associated wheel carrier 120 or 120', in particular the associated countershaft transmission 160 or 160', is larger than the distance to the respectively associated electric motor 130, 130'. Preferably, the countershaft transmissions 160, 160' are in the form of step-down transmissions and form, for example in addition to the offset transmissions 140, 140', a further step-down stage. For example, the countershaft transmissions 160, 160' are each in the form of planetary gear transmissions.

As can be seen for example from FIG. 2, the offset transmissions 140, 140' each comprise at least one gearset 10 or 10', which comprises a main gearwheel 10.1 or 10.1', at least one and preferably two intermediate wheels 10.2 or 10.2' and 10.3 or 10.3', and a ring gear 10.4 or 10.4'. The main wheel 10.1 or 10.1' meshes with one of the intermediate wheels 10.2 or 10.2' and 10.3 or 10.3', in particular the intermediate wheel 10.2 or 10.2', which in turn meshes with the other intermediate wheel 10.3 or 10.3' Preferably the main wheel 10.1 or 10.1' and the intermediate wheels 10.2 or 10.2' and 10.3 or 10.3' are surrounded by the ring gear 10.4 or 10.4', so that the main wheel 10.1 or 10.1' and the outer intermediate wheel 10.3 or 10.3' mesh with the inner teeth of the ring gear 10.4 or 10.4'. Preferably, the main wheel 10.1 or 10.1' is associated with the drive input shaft 1 or 1' and the ring gear 10.4 or 10.4' with the drive output shaft 2 or 2', in particular connected rotationally fixed thereto. Preferably, the at least one intermediate wheels 10.2 or 10.2' and 10.3 or 10.3' are mounted on respective rotational axes 5 or 5' and 6 or 6', the rotational axes being fixed relative to the housing component 40 and/or the further housing component 50, in particular attached thereto.

The rigid axle 100 can be provided as an assembly together, respectively, with a wheel brake 500 or 500' that acts upon the associated wheel carrier 120 or 120' (FIG. 1). For example, the wheel brake 500 or 500' is a disk brake that preferably comprises an actuator device 510, 510', a brake caliper 530, 530' and a brake disk 520, 520'. The wheel brake 500 or 500' can be a standard disk brake for utility vehicles. The actuator device 510 or 510' can for example be of cylindrical shape or can have a preferably cylindrical actuator housing 520, 520' or can comprise such a brake cylinder. Relative to its central axis 550 (FIGS. 6 and 7) the actuator housing 520, 520' is for example arranged parallel to the longitudinal axis 200 of the rigid axle 100 and is for example directly and/or immediately adjacent to the housing component 40 or 40' and/or the further housing component 50 or 50'.

Figure 3:
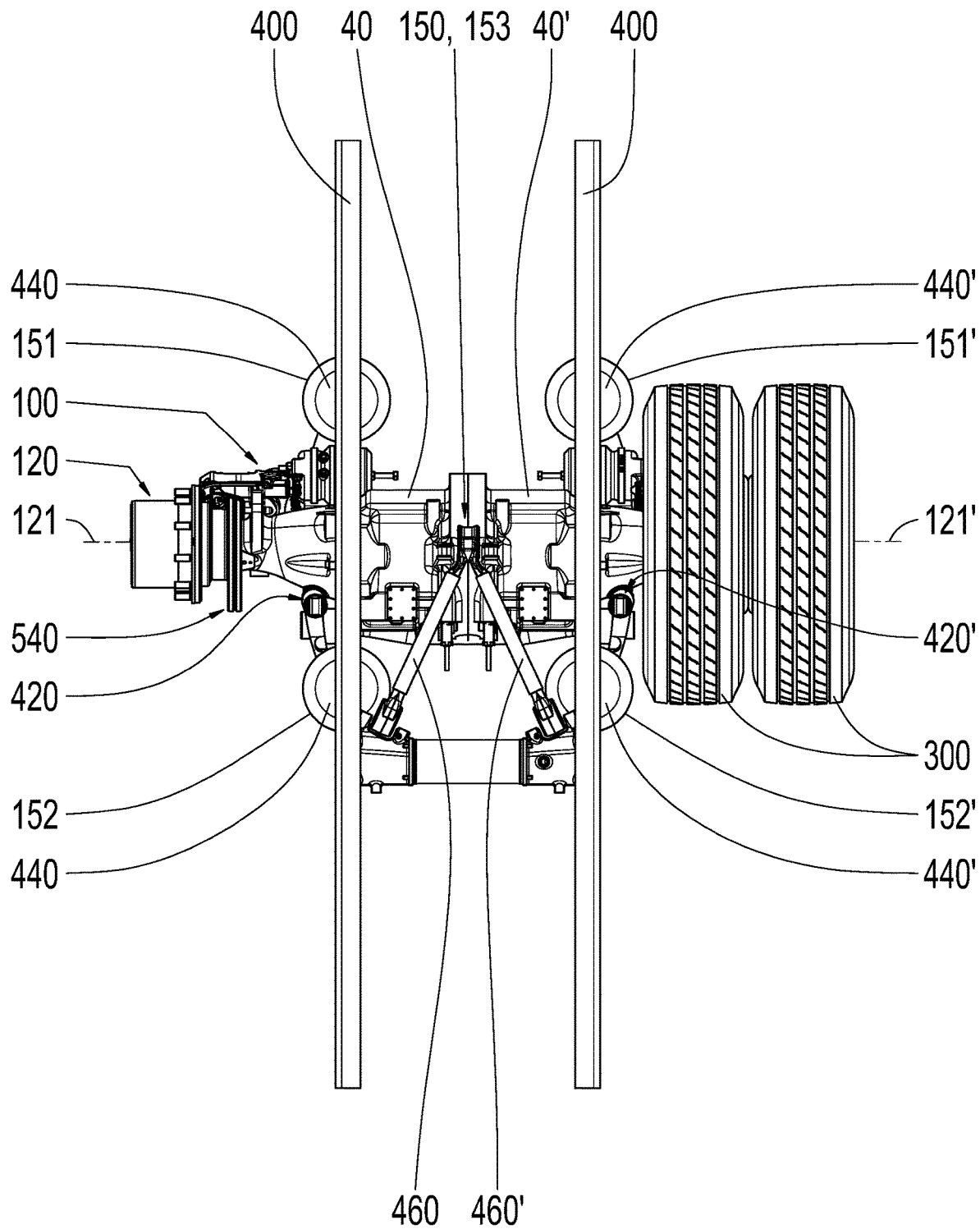
Figure 4:
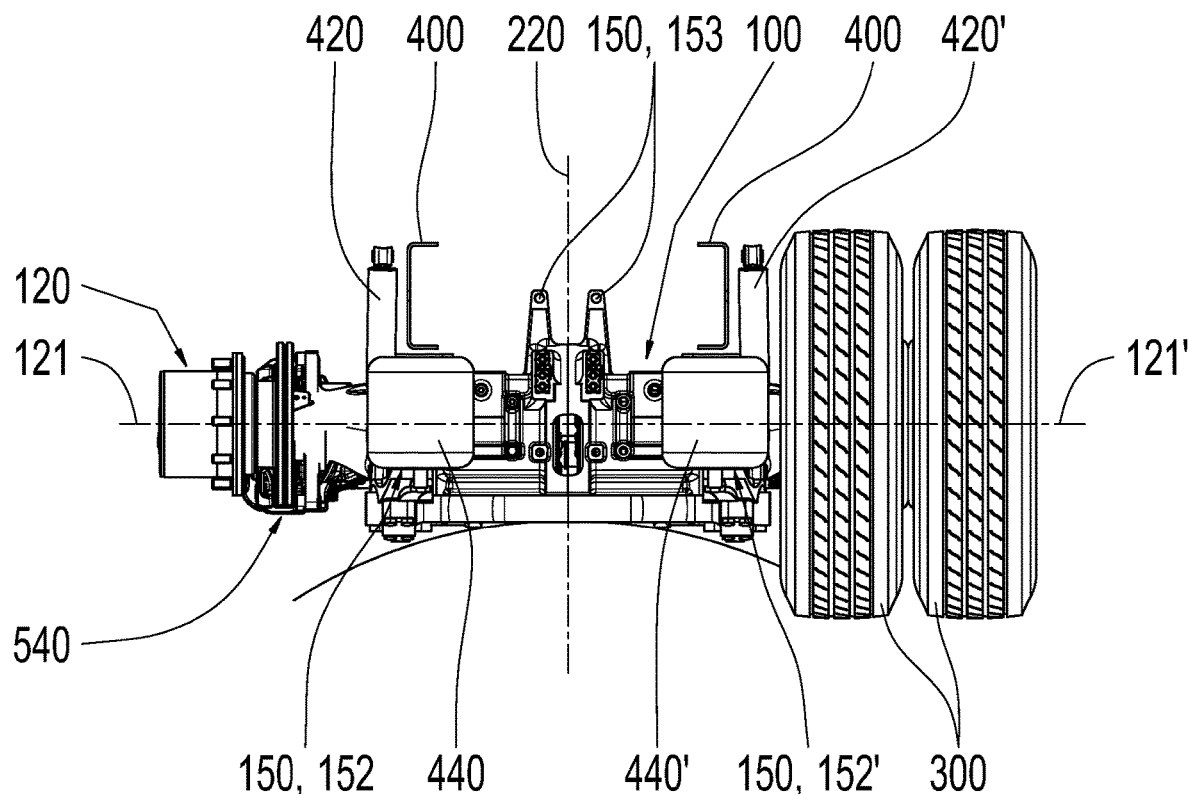
FIG. 4: The fitted arrangement of FIG. 3, viewed from the front.
Figure 5:
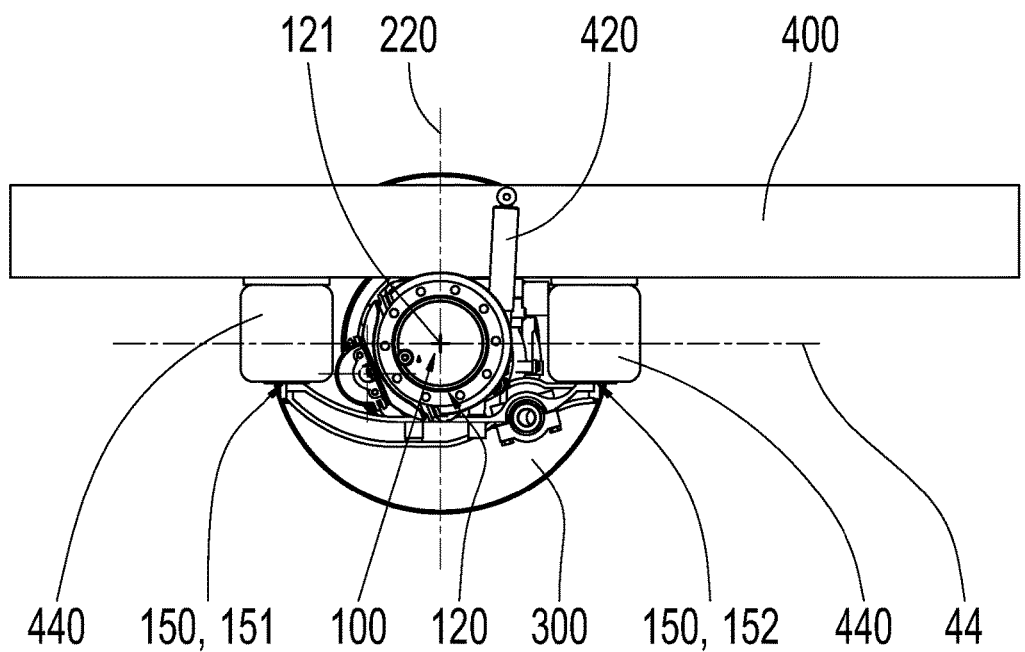
FIG. 5: The fitted arrangement of FIG. 3 viewed from the side.

As can be seen from FIG. 1, the rigid axle 100 also has a plurality of attachment points 150 that can be used for fixing the axle body 110 to a vehicle frame. The type of connections and the position of the rigid axle 100 in its installed condition on a vehicle are shown, as examples, in FIGS. 3 to 5. Therein, the vehicle frame is indicated by two longitudinal support members arranged parallel to one another and the vehicle frame or longitudinal supports are indexed 400. Further, therein as an example, on one of the wheel carriers 120 or 120', namely on the wheel carrier 120', a vehicle wheel 300 is shown. For example, the vehicle wheel 300 is a standard wheel for a truck in the form of a double wheel with twin tires. FIG. 3 shows the rigid axle 100 in the installed condition on the vehicle frame 400 as viewed from above. FIG. 4 shows the rigid axle 100 in the installed condition as viewed from the front. FIG. 5 shows the rigid axle 100 in the installed condition as viewed from the side, looking in the direction of the longitudinal axis 200 of the rigid axle 100.

As can be seen from FIGS. 3 to 5, the attachment points 150 can comprise a plurality of air-spring carriers 151, 151', 152, 152', on which air springs 400 or 440' rest (FIG. 3) and on which the vehicle frame 400 is supported. The attachment points 150 can also have one or more control arm fixing points 153, to which control arms 460 or 460' of a wishbone control arm are attached (FIG. 3). In addition, shock-absorbers 420, 420' can be fitted on the rigid axle 100, which form part of the attachment points 150. The attachment points 150 enable the rigid axle 100, in the installed condition, to be attached in a predetermined position on a motor vehicle, in particular on the vehicle frame 400.

Figure 6:
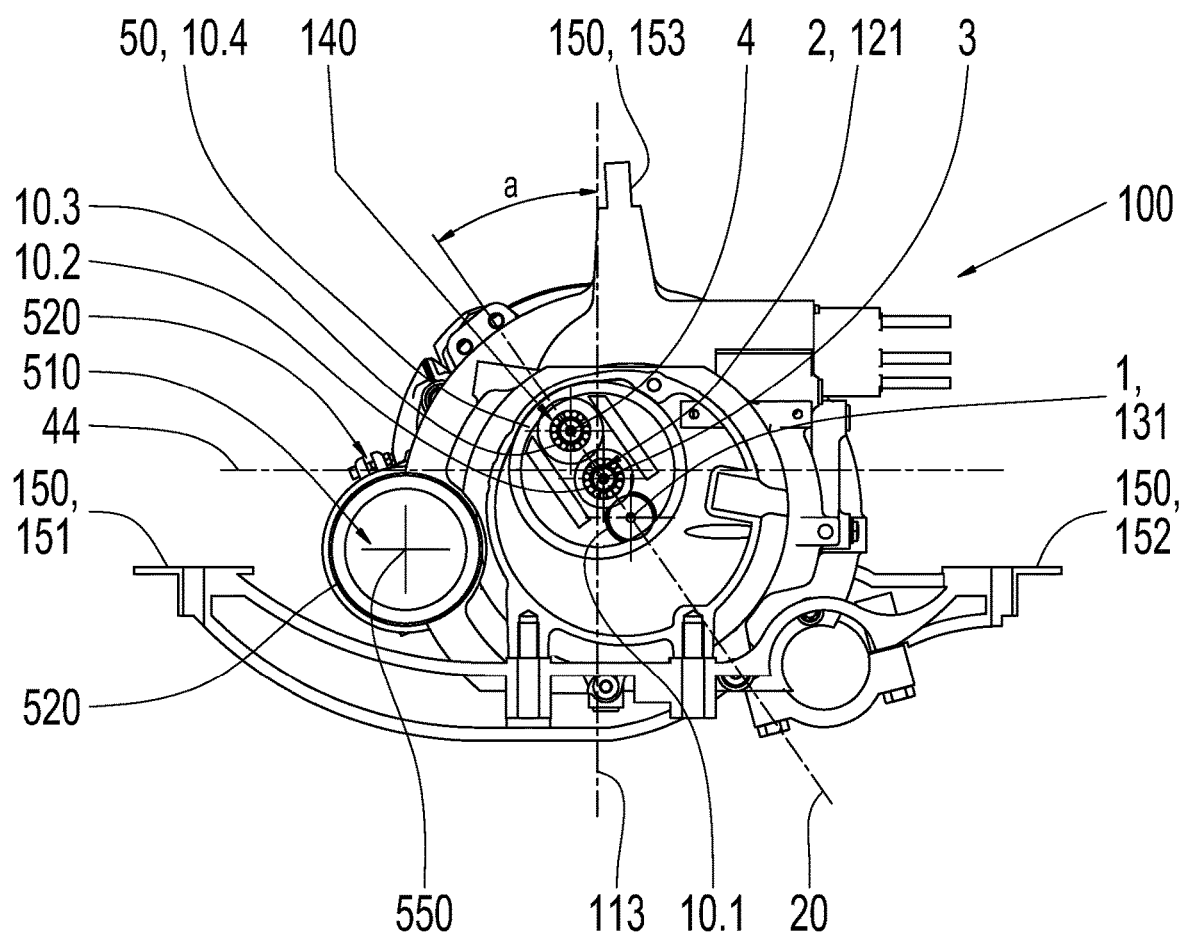
FIG. 6: The rigid axle of FIG. 1 as a partial section viewed from the side.
Figure 7:
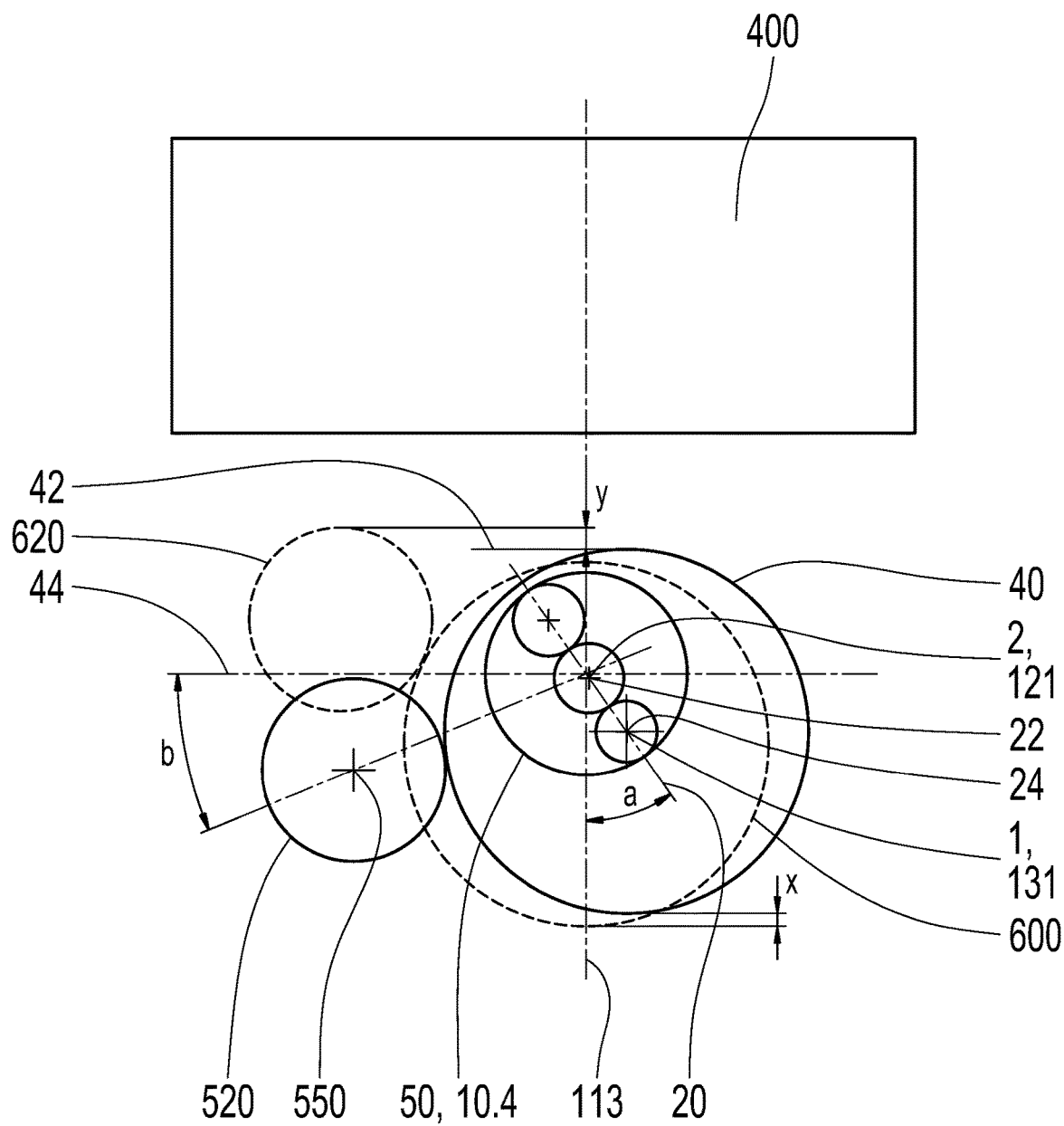
FIG. 7: A simplified, schematic representation of the rigid axle according to FIG. 6.

FIGS. 6 and 7 show an example of the rigid axle 100 in the installed condition seen in FIGS. 3 to 5, wherein in this case the housing component 50 or 50' is omitted so that from the respective side views shown, the position of the transmission elements of the offset transmission 140 can be seen as an example. FIG. 6 shows the rigid axle 100 in the installed position. However, the vehicle frame 400 has been omitted. FIG. 7 shows a schematic representation of the structure of the rigid axle 100, viewed from the side, and in the figure the vehicle frame 400 is at least indicated.

As can be seen from FIGS. 6 and 7, by means of the attachment points 150 the axle body 110 is to be fixed to the vehicle frame 400 in such manner that as viewed in a cross-section of the rigid axle 100, the axle body 110 faces toward the vehicle frame 400 at an upper end 112, and an axis of the axle body 110 forms the vertical axis 113 extending in the direction toward the upper end 112, which axis intersects with the associated wheel axis 121 or 121'. Furthermore, as viewed in the cross-section of the rigid axle 100, the motor shafts 131 or 131' of the respective electric motors 130, 130' and the wheel axes 121, 121' offset from them form, in each case, an intersection point 22 or 24 on an offset line 20. It is now provided that as viewed in the cross-section of the rigid axle 100, the offset line 20 and the vertical axis 113 extend at an angle a relative to one another, whose vertex is at the intersection point 22 of the wheel axis 121 or 121' and the offset line 20, where the size of the angle a has a value between 1 degree and 90 degrees, in particular between 30 and 40 degrees, for example approximately 35 degrees.

As can be seen in particular from FIGS. 6 and 7, the offset transmission 140 or 140' can be orientated so that as viewed in the cross-section of the rigid axle 100, in each case the wheel axis 121, 121' is offset relative to the associated motor shaft 131 or 131' upward in the direction toward the upper end 112 of the axle body 110 and the associated motor shaft 131, 131' is offset relative to the wheel axis 121, 121' sideways, i.e. there is, as it were, a diagonal offset in which the offset line 20 extends diagonally or obliquely. In FIG. 7, as an example, the structural advantage of such a diagonal offset is indicated. In the figure, the broken line 600 shows the position of the housing 40 and the broken line 620 shows the position of the actuator housing 520 with a vertical offset with which the offset line 20 lies on the vertical axis 113. Thanks to the vertical offset, the respective motor shaft 131 or 131' is displaced sideways away from the vertical axis 113.

This results is a larger ground clearance, i.e. an increase of the distance between the underside of the rigid axle 100 relative to an underlying surface on which the vehicle is standing, as indicated for example by the distance X. At the same time there is an increase of the compression travel provided by the rigid axle 100, which is indicated as an example by the distance Y. Moreover, by virtue of the diagonal offset relative to the vertical offset the actuator device 510 or 510' of the wheel brake 500 or 500', in particular the actuator housing 520 or 520', is brought to a position offset downward which, for example, relative to a horizontal line 44 perpendicular to the vertical axis 113 and intersecting with the wheel axis 121 or 121', is positioned at an angle b. The angle b can be chosen of a size such that the outer circumference of the actuator housing 520 or 520' is positioned under a tangent 42 to the housing component 40 or 40' that extends perpendicularly to the vertical axis 113, in particular under or on the horizontal line 44.

The limit values themselves mentioned in the present description for the ranges, are in particular included in the range concerned. Also, the ranges mentioned include any individual value contained therein.

In the present description, reference to a particular aspect or a particular embodiment or a particular design feature, means that a particular characteristic or a particular property which is described in combination with the aspect, embodiment or design feature concerned, is at least contained therein, but does not necessarily have to be present in every aspect, embodiment or design feature of the invention. It is expressly stated that any combination of the various characteristics and/or structures and/or properties which are described in relation to the invention are covered by the invention, unless this is expressly or clearly negated by the context.

The use of individual or all the examples or an exemplary expression in the text should only shed light on the invention and does not constitute any limitation regarding the scope of the invention, unless otherwise stated. Furthermore, no expression or formulation in the description is to be understood as an element which is not being claimed but which is essential for the practical realization of the invention.

INDEXES 1, 1' Drive input shaft
2, 2' Drive output shaft
3, 3' Rotation axis
4, 4' Rotation axis
10, 10' Gearset
10.1, 10.1' Main gearwheel
10.2, 10.2' Intermediate wheel
10.3, 10.3' Intermediate wheel
10.4, 10.4' Ring gear
20 Offset line
22 Intersection point
24 Intersection point
40, 40' Housing component
42 Tangent
44 Horizontal line
50, 50' Housing component
100 Rigid axle
110 Axle body
111, 111' Longitudinal end
112 Upper end
113 Vertical axis
120, 120' Wheel carrier
121, 121' Wheel axis
130, 130' Electric motor
131, 131' Motor shaft
140, 140' Offset transmission
150 Attachment point 151, 151' Air-spring support
152, 152' Air-spring support
153 Control arm fastening
160, 160' Countershaft transmission
170 Center
200 Longitudinal axis
220 Transverse axis
300 Vehicle wheel
400 Vehicle frame
420, 420' Shock-absorber
440, 440' Air spring
460, 460' Control arm
500, 500' Wheel brake
510, 510' Actuator device
520, 520' Actuator housing
530, 530' Brake caliper
540, 540' Brake disk
550 Central axis
600 Broken line
620 Broken line
a Angle
b Angle
x Distance
y Distance

The invention claimed is:

1. An electric-motor-driven rigid axle for a vehicle, the rigid axle comprising:
an axle body,
two wheel carriers, and at least one attachment point for fixing the axle body to a vehicle frame,
the axle body is of elongated form and at opposite longitudinal ends in each case one of the wheel carriers is provided, each of the wheel carriers is rotatable relative to the axle body about a wheel axis, and the at least one attachment point is designed to fix the axle body onto the vehicle frame in such a manner that, when viewed in a cross-section of the rigid axle, the axle body faces toward the vehicle frame at an upper end and an axis of the axle body forms a vertical axis that extends in a direction toward the upper end, which axis intersects with the wheel axis;
the rigid axle further comprising two electric motors arranged close to wheels and two offset transmissions, such that, in each case, one of the electric motors serves to drive one of the wheel carriers and, in each case, one of the offset transmissions is interconnected between one of the electric motors and the wheel carrier in driving association therewith, and by virtue of the offset transmission, the motor shaft of the respective electric motor and the wheel axis of the associated wheel carrier are arranged offset relative to one another, and when viewed in the cross-section of the rigid axle, the motor shaft of the respective electric motor and the wheel axis of the associated wheel carrier offset relative thereto form a point of intersection on an offset line, the offset transmissionsare orientated in such a manner that, when viewed in the cross-section of the rigid axle, the offset line and the vertical axis are positioned at an angle to one another, a vertex of the angle is at the point of intersection of the wheel axis with the offset line, a size of the angle having a value between 1 degree and 90 degrees,
the rigid axle has a center which, relative to a longitudinal distance between the wheel carriers, is half-way between the respective wheel carriers, and the electric motors are located along the rigid axle such that the longitudinal distance between the electric motors and the respective wheel carriers is greater than the longitudinal distance between the respective electric motors and the center of the rigid axle, and
the offset transmissions are, in each case, designed to be shifted between at least two gear steps.

2. The rigid axle according to claim 1, wherein the offset transmissions are orientated in such a manner that, when viewed in the cross-section of the rigid axle, in each case the wheel axis is offset relative to the associated motor shaft upward in a direction toward the upper end of the axle body, and relative to the wheel axis the associated motor shaft is offset sideways in a direction away from the vertical axis.

3. The rigid axle according to claim 2, wherein the offset transmissions are orientated in such a manner that, when viewed in the cross-section of the rigid axle relative to the wheel axis of the associated wheel carrier, the motor shaft of the respective electric motor is offset in a direction to a left of the vertical axis.

4. The rigid axle according to claim 2, wherein the offset transmissions are orientated in such a manner that, when viewed in the cross-section of the rigid axle relative to the wheel axis of the associated wheel carrier, the motor shaft of the respective electric motor is offset in a direction to a right of the vertical axis.

5. The rigid axle according to claim 1, wherein the offset transmissions each comprise a drive input shaft and an output shaft that is parallel and offset relative to the drive input shaft, each drive input shaft is drivingly connected to the respectively associated electric motor and each drive output shaft is functionally connected to the respectively associated wheel carrier, and the offset transmissions each comprise at least two gearsets and at least one shifting element, such that the at least two gearsets form, in each case, one of the at least two gear steps and the at least one shifting element is designed to be brought to at least two shift positions, in which the drive input shaft and the drive output shaft are coupled to one another, in each case, by way of one of the at least two gearsets.

6. The rigid axle according to claim 1, wherein the electric motors are accommodated in the axle body and, when viewed in a longitudinal direction of the rigid axle, are arranged one behind another.

7. The rigid axle according to claim 1, wherein in an area of the wheel carriers there is, in each case, a countershaft transmission, and the offset transmissions are, in each case, arranged between the countershaft transmission and the associated electric motor.

8. The rigid axle according to claim 1, wherein the at least one attachment point comprises a plurality of attachment points.

9. An electric-motor-driven rigid axle for vehicles, the rigid axle comprising:
an axle body,
two wheel carriers, and at least one attachment point for fixing the axle body to a vehicle frame,
the axle body is of elongated form and at opposite longitudinal ends in each case one of the wheel carriers is provided, each of the wheel carriers is rotatable relative to the axle body about a wheel axis, and the at least one attachment point is designed to fix the axle body onto the vehicle frame in such a manner that, when viewed in a cross-section of the rigid axle, the axle body faces toward the vehicle frame at an upper end and an axis of the axle body forms a vertical axis that extends in a direction toward the upper end, which axis intersects with the wheel axis, the rigid axle further comprising two electric motors arranged close to wheels and two offset transmissions, such that, in each case, one of the electric motors serves to drive one of the wheel carriers and, in each case, one of the offset transmissions is interconnected between one of the electric motors and the wheel carrier in driving association therewith, and by virtue of the offset transmission, the motor shaft of the respective electric motor and the wheel axis of the associated wheel carrier are arranged offset relative to one another, and when viewed in the cross-section of the rigid axle, the motor shaft of the respective electric motor and the wheel axis of the associated wheel carrier offset relative thereto form a point of intersection on an offset line, the offset transmissions are orientated in such a manner that, when viewed in the cross-section of the rigid axle, the offset line and the vertical axis are positioned at an angle to one another, a vertex of the angle is at the point of intersection of the wheel axis with the offset line, a size of the angle having a value between 1 degree and 90 degrees, the offset transmissions comprise, in each case, a drive input shaft, a drive output shaft parallel and offset relative to the drive input shaft, and at least one gearset, the respective drive input shaft is in driving connection with the motor shaft of the associated electric motor; and the respective drive output shaft is functionally connected to the associated wheel carrier, and the at least one gearset comprises at least one spur gear pair.

10. The rigid axle according to claim 9, wherein the drive input shaft is arranged coaxially with the motor shaft and the drive output shaft is arranged coaxially with the wheel axis.

11. The rigid axle according to claim 9, wherein the at least one gearset comprises a main gearwheel, at least one intermediate wheel and a ring gear, the main gearwheel and the at least one intermediate wheel mesh with one another and with inner teeth of the ring gear, and either:

the main gearwheel is associated with the drive input shaft and the ring gear is associated with the drive output shaft, or the main gearwheel is associated with the drive output shaft and the ring gear is associated with the drive input shaft.

12. The rigid axle according to claim 11, wherein the main gearwheel is rotationally fixedly connected to the drive input shaft and the ring gear is rotationally fixedly connected to the drive output shaft, and the at least one intermediate wheel is rotatably mounted on a rotational axis fixed on a housing by way of a bearing.

13. An assembly with an electric-motor-driven rigid axle for vehicles, the rigid axle having an axle body, two wheel carriers, and at least one attachment point for fixing the axle body to a vehicle frame, the axle body is of elongated form and at opposite longitudinal ends in each case one of the wheel carriers is provided, each of the wheel carriers is rotatable relative to the axle body about a wheel axis, and the at least one attachment point is designed to fix the axle body onto the vehicle frame in such a manner that, when viewed in a cross-section of the rigid axle, the axle body faces toward the vehicle frame at an upper end and an axis of the axle body forms a vertical axis that extends in a direction toward the upper end, which axis intersects with the wheel axis, the rigid axle further comprising two electric motors arranged close to wheels and two offset transmissions, such that, in each case, one of the electric motors serves to drive one of the wheel carriers and, in each case, one of the offset transmissions is interconnected between one of the electric motors and the wheel carrier in driving association therewith, and by virtue of the offset transmission, the motor shaft of the respective electric motor and the wheel axis of the associated wheel carrier are arranged offset relative to one another, and when viewed in the cross-section of the rigid axle, the motor shaft of the respective electric motor and the wheel axis of the associated wheel carrier offset relative thereto form a point of intersection on an offset line, the offset transmissions are orientated in such a manner that, when viewed in the cross-section of the rigid axle, the offset line and the vertical axis are positioned at an angle to one another, a vertex of the angle is at the point of intersection of the wheel axis with the offset line , a size of the angle having a value between 1 degree and 90 degrees, and the assembly having two wheel brakes, of which in each case one of the wheel brakes is associated with one of the wheel carriers of the rigid axle, the electric motors of the rigid axle are each associated with and accommodated in a housing component of the axle body of the rigid axle, and in each case adjacent to the housing component there is arranged an actuator housing of an actuator device of the wheel brake, and an outer circumference of the actuator housing is under a tangent of the housing component that extends perpendicularly to the vertical axis.

14. The assembly according to claim 13, wherein the outer circumference of the actuator housing is under a horizontal line that extends perpendicularly to the vertical axis and intersects with the wheel axis.

15. A motor vehicle comprising an assembly with an electric motor-driven rigid axle according to claim 13.

16. The rigid axle according to claim 11, wherein the ring gear forms a sidewall of a pot-shaped transmission element, the transmission element has a bottom at one axial end and is open at an opposite axial end, the bottom of the transmission element is rotationally fixedly connected to one of the drive output shaft and the drive input shaft, and the open axial end of the transmission element faces toward a housing component that accommodates the associated electric motor.

* * * * *